(12) United States Patent
Frangineas

(10) Patent No.: US 7,656,592 B2
(45) Date of Patent: Feb. 2, 2010

(54) OPTICAL SYSTEM HAVING ABERRATIONS FOR TRANSFORMING A GAUSSIAN LASER-BEAM INTENSITY PROFILE TO A QUASI-FLAT-TOPPED INTENSITY PROFILE IN A FOCAL REGION OF THE OPTICAL SYSTEM

(75) Inventor: George Frangineas, Fremont, CA (US)

(73) Assignee: Reliant Technologies, Inc., Mountain View, CA (US)

( * ) Notice: Subject to any disclaimer, the term of this patent is extended or adjusted under 35 U.S.C. 154(b) by 265 days.

(21) Appl. No.: 11/567,614

(22) Filed: Dec. 6, 2006

(65) Prior Publication Data
US 2007/0140092 A1   Jun. 21, 2007

Related U.S. Application Data

(60) Provisional application No. 60/751,177, filed on Dec. 16, 2005.

(51) Int. Cl.
G02B 9/00 (2006.01)
G02B 13/18 (2006.01)
H01S 3/10 (2006.01)
B23K 26/06 (2006.01)

(52) U.S. Cl. ............................ 359/754; 359/708; 372/9; 219/121.75

(58) Field of Classification Search ................. 359/708, 359/713–717; 372/9
See application file for complete search history.

(56) References Cited

U.S. PATENT DOCUMENTS

| | | | |
|---|---|---|---|
| 4,718,416 A | 1/1988 | Nanaumi | |
| 5,065,407 A | 11/1991 | Pax | |
| 5,106,387 A | 4/1992 | Kittrell et al. | |
| 5,558,666 A | 9/1996 | Dewey et al. | |
| 5,860,968 A | 1/1999 | Wojcik et al. | |
| 6,532,244 B1 | 3/2003 | Dewey et al. | |
| 6,537,270 B1 | 3/2003 | Elbrecht et al. | |
| 6,575,964 B1 | 6/2003 | Hobart et al. | |
| 6,879,448 B2 * | 4/2005 | Hoffnagle et al. | 359/754 |
| 6,887,233 B2 | 5/2005 | Angeley et al. | |
| 6,951,558 B2 | 10/2005 | Angeley et al. | |
| 2004/0061952 A1 * | 4/2004 | Coufal et al. | 359/754 |
| 2004/0238504 A1 | 12/2004 | Aubry et al. | |
| 2005/0040150 A1 | 2/2005 | Denney et al. | |
| 2005/0285928 A1 | 12/2005 | Broome et al. | |
| 2006/0044981 A1 * | 3/2006 | Egawa et al. | 369/53.24 |
| 2006/0247609 A1 | 11/2006 | Mirkov et al. | |

OTHER PUBLICATIONS

U.S. Appl. No. 60/673,914, filed Apr. 22, 2005, 18 pages.
PCT International Search Report and Written Opinion, PCT/US06/47273, Apr. 2, 2008, 8 pages.
Shafer, D., "Gaussian to Flat-Top Intensity Distributing Lens," Optics and Laser Technology, Jun. 1982, pp. 159-160, Butterworth & Co. (Publishers) Ltd.

* cited by examiner

*Primary Examiner*—Jordan M. Schwartz
(74) *Attorney, Agent, or Firm*—Wood, Herron & Evans, LLP

(57) ABSTRACT

An optical system is configured for projecting an image having a quasi-flat-topped intensity profile from a laser-beam having a Gaussian intensity profile. The optical system includes a diffraction limited lens for focusing the laser beam and one or more optical elements that introduce aberration into the beam before the beam is focused. The aberration introduced causes the Gaussian intensity profile to be changed to the quasi-flat-topped intensity profile at some position in a focal region of the diffraction-limited lens.

30 Claims, 8 Drawing Sheets

OPTICAL SYSTEM HAVING ABERRATIONS FOR TRANSFORMING A GAUSSIAN LASER-BEAM INTENSITY PROFILE TO A QUASI-FLAT-TOPPED INTENSITY PROFILE IN A FOCAL REGION OF THE OPTICAL SYSTEM

CROSS-REFERENCE TO RELATED APPLICATION

This application claims priority under 35 U.S.C. § 119(e) to U.S. Provisional Patent Application Ser. No. 60/751,177, "Optical System Having Aberrations for Transforming a Gaussian Laser-Beam Intensity Profile to a Quasi-Flat-Topped Intensity Profile in a Focal Region of the Optical System," filed Dec. 16, 2005, the subject matter of which is incorporated herein by reference in its entirety.

TECHNICAL FIELD OF THE INVENTION

The present invention relates in general to laser-beam shaping systems. The invention relates in particular to optical systems for projecting a laser-beam, initially having a Gaussian intensity profile, into an image plane such that, in the image plane, the intensity profile in the beam is quasi-flat-topped.

DISCUSSION OF BACKGROUND ART

Many types of laser can be configured to deliver a beam in a single longitudinal mode with maximum beam quality. Beam quality is usually defined by a term $M^2$. The beam quality $M^2$ is often defined by the ratio of a diameter-divergence product of the beam to the ideal, (single-mode) diffraction-limited ($TEM_{00}$) beam diameter-divergence product. It can also be defined as the square of the ratio of the beam diameter to the diffraction-limited beam diameter. An ideal diffraction-limited beam would have a value of $M^2$ equal to 1.0. In a pure single-mode beam, the intensity profile transverse to the beam is Gaussian. If a pure single-mode beam is focused by a diffraction-limited optical system, the focused beam will have a Gaussian intensity profile. On either side of the focal plane, within several Rayleigh ranges in front of and behind the focal plane, the transverse energy distribution will also be essentially Gaussian. The Rayleigh range is the distance a beam must travel in order for the beam diameter to increase to 1.414 times the beam diameter at the waist.

A Gaussian or near-Gaussian intensity profile in a focused laser-beam is useful for applications such as laser drilling of very small diameter holes, for example holes having a diameter of a few micrometers (µm) or less. There are other applications, however, such as laser welding, laser material processing, and laser tissue treatment for which a broader, flat-topped or quasi-flat-topped intensity profile would be preferable. In many of these applications, a focused beam from a laser in a fixed position must be mechanically scanned over a surface being treated or along a seam being welded.

The prior-art includes several different arrangements for providing flat-topped or quasi-flat-topped intensity profile. These arrangements include the use of optical elements such as highly aspheric lens elements, diffractive optical elements, and beam-homogenizing devices such as microlens arrays, alone or in combination. All of these optical elements are usually more complex and expensive to produce, in comparable quality, than simple, spherical optical elements. Microlens-array type beam homogenizers are not suitable for use in an optical system wherein a focused beam must be scanned as discussed above.

There is a need for reducing the complexity and cost of optical systems that focus a laser-beam having a Gaussian or near-Gaussian intensity profile into an image plane such that the energy intensity profile of the beam in the image plane is quasi-flat-topped. Preferably, the complexity and cost reduction should be achieved while still providing a capability for scanning the laser-beam over a surface or tissue being irradiated by the beam.

SUMMARY OF THE INVENTION

In one aspect, apparatus in accordance with the present invention comprises an optical system arranged to receive a laser-beam having a substantially Gaussian intensity profile. The optical system includes a substantially diffraction-limited lens having a longitudinal optical axis and is arranged to focus the laser-beam into a focal region having a depth extending parallel to the optical axis. The optical system further includes one or more optical elements configured to introduce one or more optical aberrations into the laser-beam before the laser-beam is focused into the focal region by the diffraction-limited lens. The extent of the one or more optical aberrations introduced by the one or more aberration-introducing elements is arranged such that the intensity profile of the focused laser-beam is quasi-flat-topped at one or more paraxial positions in the focal region.

The laser-beam may be a diverging beam delivered from a laser via an optical fiber, or a diverging beam generated and delivered by a fiber laser. The laser-beam may also be a substantially collimated laser-beam delivered directly from a laser, or collimated after being delivered from the laser. In the case of the fiber-delivered or fiber-generated diverging beam a single aberration-introducing element can be used to collimate the laser-beam and introduce the aberrations. In a case where the laser-beam is already substantially collimated, two aberration-introducing elements may be configured to either afocally increase or afocally decrease the diameter of the laser-beam.

There are several laser applications that can benefit from image intensity profiles that are quasi-flat-topped. By way of example, certain laser dermatological treatments have better tissue interactions and better thermal interactions when the incident intensity profile is of a flat-topped or quasi-flat-topped form than when the incident intensity profile is Gaussian. A flat-topped or quasi-flat-topped intensity profile reduces both charring of tissue at the center of the image and under-treatment at the periphery of the image. A large number of industrial laser welding, laser cutting, laser annealing, and related operations can also benefit from incident intensity profiles that are of a flat-topped or quasi-flat-topped form. Such image intensity profiles are useful in welding and other material processing operations because material at the center of the treated image does not become vaporized while material at the periphery remains in a solid state. Other aspects and potential applications of the present invention will be evident to one skilled in the art from the detailed description of the invention presented hereinbelow.

DETAILED DESCRIPTION OF THE INVENTION

Figure 1:
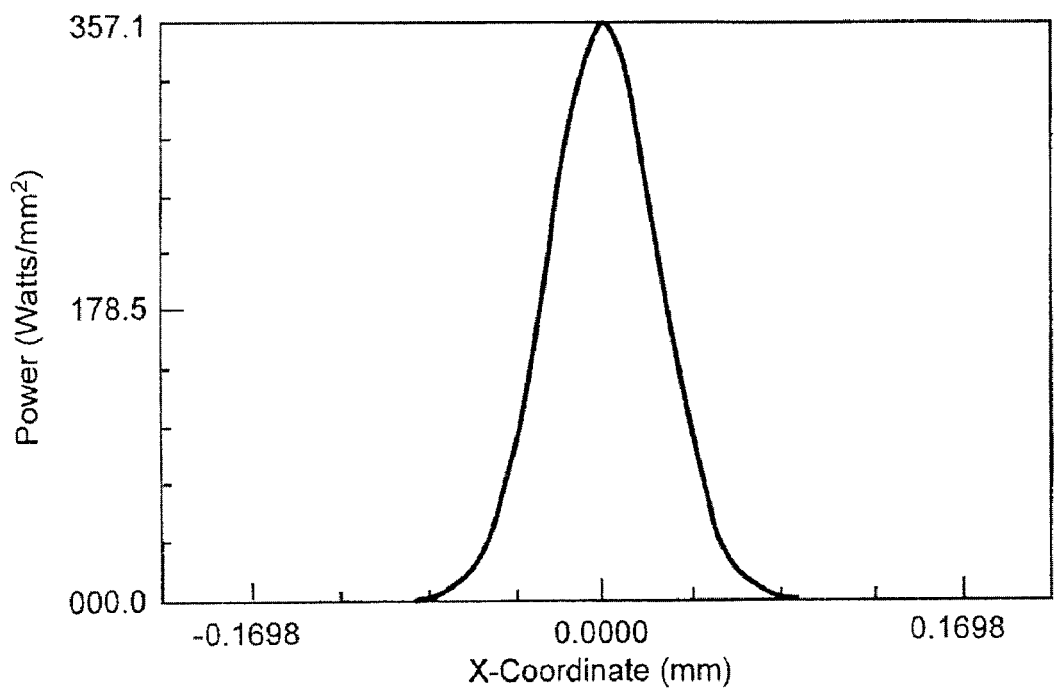
FIG. 1 is a graph schematically illustrating a calculated physical optics propagation (POP) beam intensity profile along an axis transverse to the propagation axis for an image projected by a prior-art, diffraction-limited optical system from an input laser-beam having a Gaussian intensity profile.

As noted above, a diffraction-limited optical system for projecting an image of a laser-beam Gaussian POP intensity profile (hereinafter, simply intensity profile) will produce an image that has a Gaussian radial intensity profile in a focal plane transverse to the optical axis of the optical system. This intensity profile will be the same at any transverse plane in a focal region extending from in front of, to behind the focal plane.

In embodiments of the present invention one or more aberrations, for example, third-order spherical aberration and defocus, are introduced into a Gaussian laser-beam before the beam is projected by a diffraction limited-imaging lens. These aberrations are used to make the image larger in diameter than would be the case for a comparable, entirely diffraction-limited system, to cause the image to have a lower peak intensity than a diffraction limited Gaussian image, and to have a quasi-flat-topped intensity profile. Embodiments of the present invention described below provide quasi-flat-topped image intensity profiles by means of introducing low levels third-order spherical aberration combined with defocus, into the imaging optical system. The effect of the aberrations is coupled to the image numerical aperture of the optical system. The amount of spherical aberration required to achieve a quasi-flat-topped intensity profile is dependent upon this numerical aperture. In order for the above relationships between beam intensity profile and image intensity profile to be true, the optical system must have a physical input aperture sufficient to admit most of the input laser-beam. An optical system aperture that is at least about 1.5 times greater than the $1/e^2$ diameter of the input laser-beam has been found to be adequate to ensure that the desired transformations of intensity profile from the input beam to the image will occur.

The invention may also be described generally from a Fourier optics viewpoint.

The Fourier optics view of image formation is that an incident plane, diverging, or converging wavefront is transformed by a diffraction-limited optical system into a converging spherical wavefront. Small perturbations from a spherical wavefront exist if the input beam intensity profile is uniform. For an input beam having a Gaussian intensity profile, these perturbations vanish for large enough apertures, and the image-forming wavefront is spherical. At the image focus in an unaberrated system, this converging wavefront arrives completely in-phase and thereby produces the Gaussian, diffraction-limited image intensity profile discussed above.

The presence of optical system aberrations, such as the above discussed third-order spherical aberration, will deform the image-forming wavefront to a non-spherical form. Different zones of the convergent wavefront will arrive at the image surface out of phase, and the image intensity profile will thereby become larger and have a non-Gaussian distribution. In an optical system in which such aberrations exist simply because the system is inadequately corrected, the image intensity profile can be non-Gaussian, but at the system focus, and in all defocus positions, the intensity profile retains a peak at the image centroid and drops off gradually with increasing radial distance from the image centroid. In optical systems in accordance with the present invention, aberrations are deliberately introduced. The balance of the aberrations and the image numerical aperture are of sufficient magnitude that an image is produced that is larger than a diffraction-limited image, that has a peak intensity that is significantly lower than the diffraction-limited peak intensity, and that has a quasi-flat-topped image intensity profile.

It should be noted here that the terminology quasi-flat-topped as used in this description and the appended claims is meant to include either: an intensity as a function of radial position rising from a minimum value to some peak value at a distance from the center of the distribution, retaining about that same peak intensity through the center of the distribution to some point on the opposite side of the center, and then falling again to the minimum value; or a distribution having two or more intensity peaks with intensity troughs therebetween.

Referring now to the drawings, wherein like components are designated by like reference numerals, FIG. 1 is a graph schematically illustrating a calculated intensity profile along the X-axis (transverse to the propagation axis) for an image projected by a prior-art, diffraction-limited optical system from an input laser-beam having a Gaussian intensity profile. The peak intensity has the maximum value of about 357 watts per square millimeter $W/mm^2$, and the width of the image at the $1/e^2$ diameter is 85 µm. The input laser-beam is assumed to have a wavelength of 1.064 µm, and is assumed to have a $1/e^2$ diameter of 1.60 millimeters (mm), and the optical system aperture is 1.5 times greater than the $1/e^2$ diameter of the input laser-beam. A wavelength of 1.064 nm is assumed in all other calculated examples discussed herein.

Figure 2:
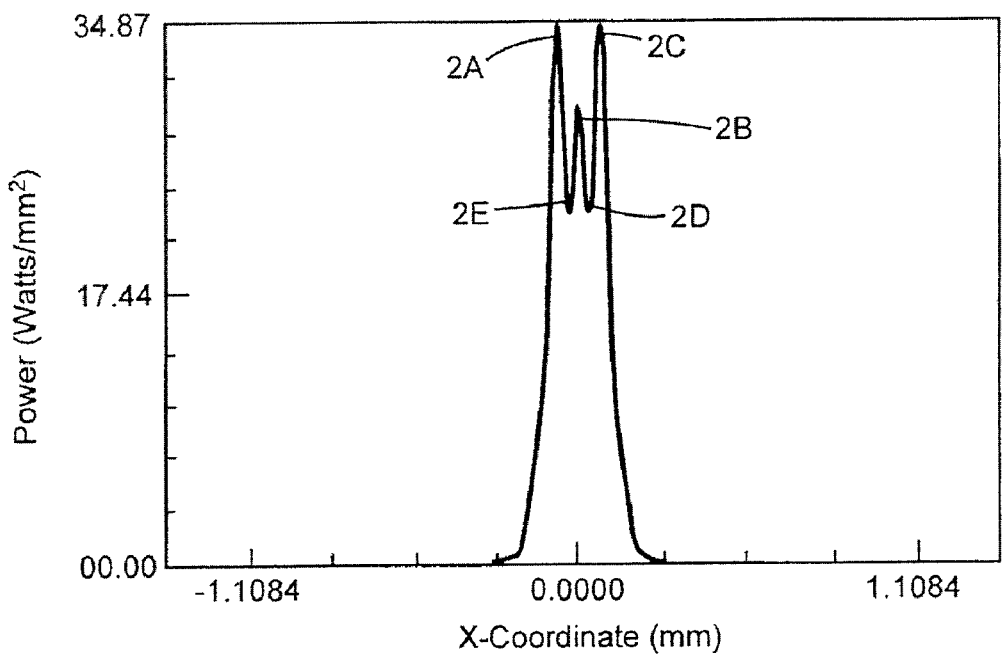
FIG. 2 is a graph schematically illustrating a calculated POP beam intensity profile along an axis transverse to the propagation axis for an image projected by one preferred embodiment of an optical system in accordance with the present invention from an input laser-beam having a Gaussian intensity profile.

FIG. 2 shows a calculated intensity profile along the X-axis for an image produced by one embodiment of an optical system in accordance with the present invention. It is assumed, here, that the input beam is delivered from a substantially $TEM_{00}$ laser, via a single-mode fiber having a substantially Gaussian laser-beam waist at an exit end thereof, or from a single-mode fiber-laser. The input beam power and wavelength are assumed to be the same as in the example of FIG. 1.

In the optical system providing the intensity profile of FIG. 2, the diverging laser-beam from the optical fiber (or fiber laser) is assumed to be substantially collimated by a singlet collimator element, then focused by a diffraction-limited focusing lens into a focal region of the lens. The collimator element is configured to introduce third-order spherical aberration into the optical system and thus create a quasi-flat-topped distribution within the focal region.

In the distribution of FIG. 2, there are three intensity peaks 2A, 2B and 2C separated by intensity troughs 2D and 2E. The peak intensity (peaks 2A and 2C) is about 30 $W/cm^2$ and the width of the image at the $1/e^2$ diameter is about 370 microns. This is consistent with the fact that the volume under the two intensity profile curves must have a common value since the volume in the intensity profile corresponds to the power in the input laser-beam.

Figure 3:
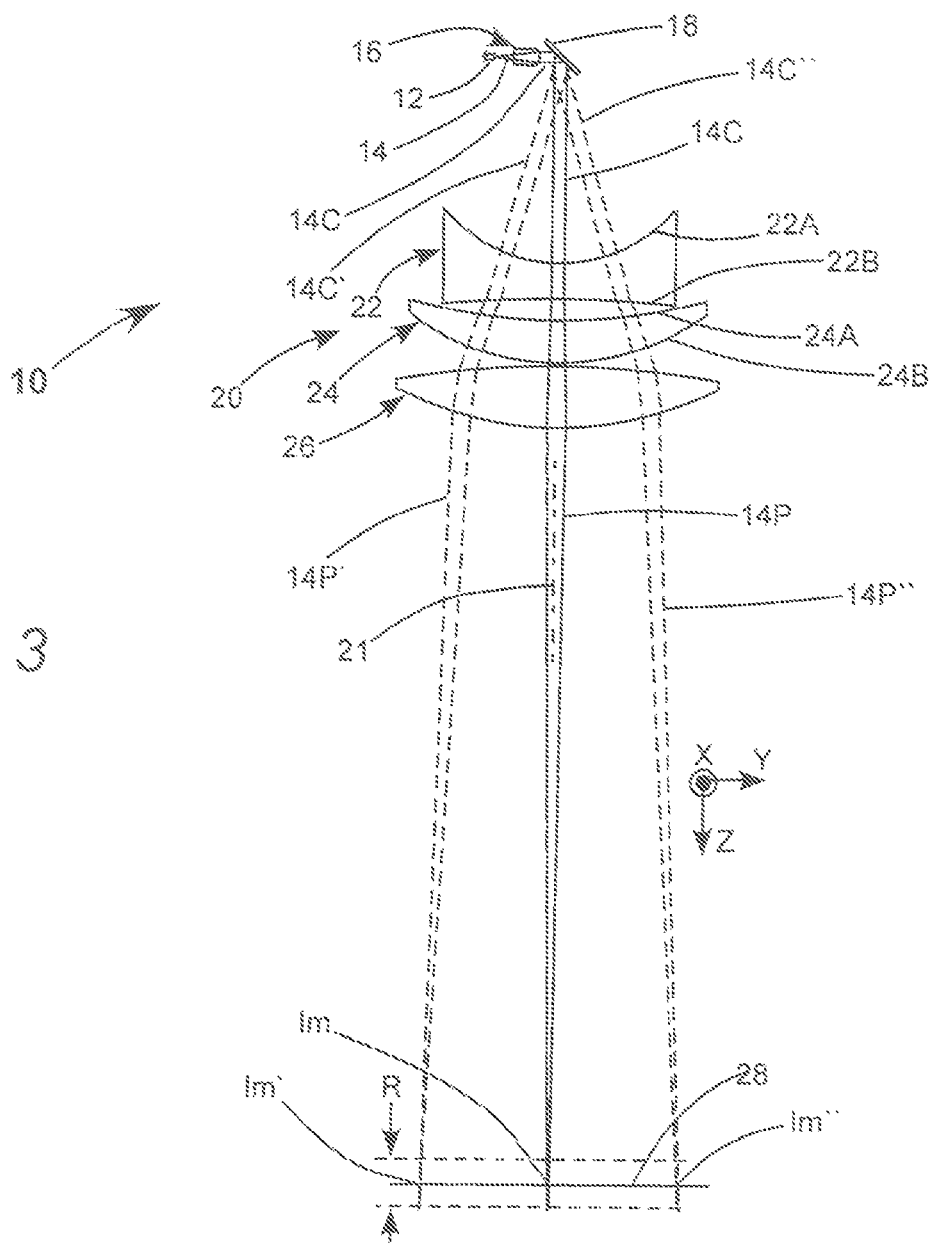
FIG. 3 schematically illustrates details of the optical system providing the POP beam intensity profile of FIG. 2, wherein the input laser-beam is a diverging beam delivered via an optical fiber and the optical system includes a singlet lens element for collimating the input laser-beam and introducing third order spherical aberration into the collimated beam, a diffraction-limited lens for projecting the image from the collimated beam, and a scanning mirror located between the singlet lens and the diffraction-limited lens for scanning the image to different positions in an image plane of the diffraction-limited lens.
Figure 3A:
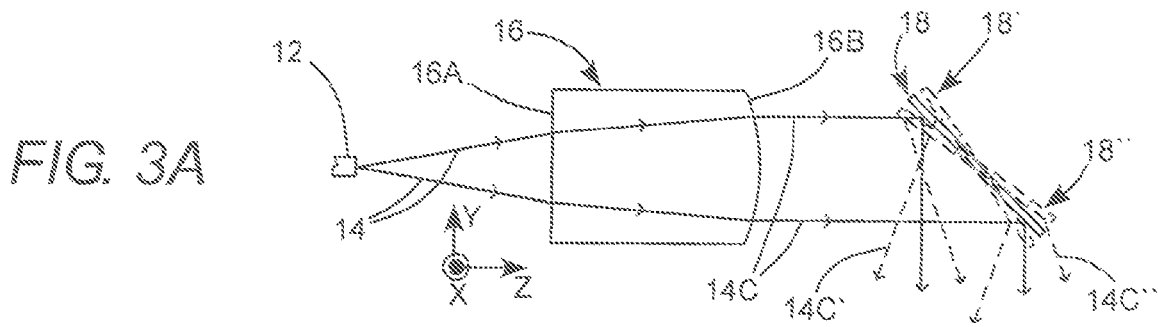
FIG. 3A schematically illustrates further detail of the optical fiber, the singlet collimator and the scanning mirror of FIG. 3.

FIG. 3 and FIG. 3A schematically illustrate details of the embodiment 10 of the inventive optical system that produces the quasi-flat-topped image intensity profile of FIG. 2. An optical fiber 12 delivers a diverging laser-beam, here represented by rays 14. Laser-beam 14 has a Gaussian intensity profile. A singlet lens element 16 has positive optical power. In this example element 16 has a plane entrance face 16A and a convex output face 16B collimates beam 14. The collimated beam (designated by rays 14C) is directed by a scanning mirror 18 to a diffraction-limited projection lens 20 including optical elements 22, 24, and 26. When scanning mirror is inclined at 45 to collimated beam 14C, the beam is reflected by the mirror and propagates along optical axis 21 of the lens, as indicated in FIG. 3 by solid lines (rays) 14P. The lens focuses the beam 14P into a focal region R extending axially on either side of a focal plane 28. In practice, the beam has a narrow "waist" with the narrowest point of the waist corresponding to the focal plane 28 of the optical system. The focal region for purposes of this invention can be defined as a region about four Rayleigh ranges, axially, in front of and behind the nominal waist position. A surface to receive focused laser beam may be located in the waist position or in some other plane axially displaced therefrom in the waist position, i.e., in a "defocus position". The intensity profile in the beam depends on the aberration introduced and the defocus position. The beam waist location resulting from the aberrations introduced may be displaced from the nominal waist position of the optical system in the absence of aberrations. This is discussed in detail further hereinbelow.

Varying the inclination of mirror 18 to beam 14C from the nominal 45° inclination directs the beam through lens 20 laterally displaced from axis 21 thereof. In FIG. 3A this is indicated by depicting mirror 18 in dashed outline in positions 18' and 18". Corresponding inclinations the reflected collimated beam are indicated by dashed rays 14C' and 14C". Corresponding projected beams 14P' and 14P" are depicted by dashed lines in FIG. 3, and produce corresponding images Im' and Im" laterally displaced from axis 21.

In a scanning optical system such as optical system 10, it is preferable that the imaging lens (here, lens 20) be arranged with respect to mirror 18 such that the lens is somewhat telecentric, that is to say, sufficiently close to telecentric that the interfering wavefronts for each image point are substantially identical, and the image intensity profiles in the image points will be substantially identical. Preferably, no scanned projected beam that is laterally displaced from axis 21 should be inclined at greater than about plus or minus 10° to axis 21.

In the example of optical system 10 used to calculate the intensity profile of FIG. 2, optical fiber 12 has a NA of 0.1. Aberration-introducing and collimating element 16 is made from F4 glass. Entrance face 16A of element 16 is a plane (infinite radius of curvature) surface, and is located 5 mm from optical fiber 12. Exit face 16B of element 16 has a convex radius of curvature of 5.11 mm. Element 16 has an axial (vertex) thickness of 5.0 mm. Mirror 18 is a plane mirror axially located 5.00 mm from exit face 16B of element 16.

In lens 20, element 22 is made from BK7 glass, and has an entrance face 22A having a concave radius of curvature of 33.679 mm, axially located 43.55 mm from mirror 18. Element 22 has an exit face 22B having a concave radius of curvature of 222.078 mm. The axial thickness of element 22 is 7.349 mm. Element 24 is made from SF11 glass and has an entrance face 24A having a concave radius of curvature of 137.219 mm, axially located 4.536 mm from surface 22B of element 22. Element 24 has an exit face 24B having a convex radius of curvature of 57.486 mm. The axial thickness of element 24 is 9.073 mm. Element 26 is also made from SF11 glass and has an entrance face 26A having a convex radius of curvature of 207.716 mm, axially located 0.544 mm from surface 24B of element 24. Element 26 has an exit face 26B having a convex radius of curvature of 80.622 mm. The axial thickness of element 26 is 12.702 mm. Image plane 28 is axially located 166.500 mm surface 26B of element. In optical system 10 the waist of a focused, projected beam 14P has a diameter of 45.9 µm and has a Rayleigh range of about 6.2 mm.

It is emphasized here that if a perfectly collimated, Gaussian laser-beam were projected by diffraction-limited lens 20, a focused image in focal region R would have the Gaussian intensity profile depicted in the graph of FIG. 1, as the lens introduces no significant aberration in the beam. In optical system 20, aberration-introducing element 16, as specified above collimates a diverging Gaussian laser-beam and introduces one-wavelength peak-to-valley of third order spherical aberration in the collimated beam 14C. As a result, when that aberrated collimated beam is focused by lens 20, the image intensity profile, in planes in at least a portion of the focal region, has the desired, quasi-flat-topped form depicted in the graph of FIG. 2. This aberration-introducing collimator design is tolerant of high laser-beam power levels, for example about 300 Watts (W), is insensitive to manufacturing tolerances, and, in combination with an existing diffraction-limited lens, provides a cost-effective means of providing a quasi-flat-topped beam. The aberration-introducing collimator may, however, have a more complex design, for example, a multi-element or aspheric design, without departing from the spirit and scope of the present invention.

Similarly, the diffraction-limited lens need not have the specification of lens 20 described above. Other imaging lenses with essentially diffraction-limited imagery in combination with element 16 can be used to form images having the quasi-flat-topped intensity profile. Further, scanning or selective directing the beam at different positions into the imaging lens to provide corresponding different image positions transverse to the lens axis is not limited to the tilting plane mirror arrangement of FIGS. 3 and 3A, and is not limited to spacing image positions along a single transverse axis. Any other beam scanning or selective beam-displacing device, providing either single-axis or two-axis beam scanning, such as a two-mirror galvanometer, a scanner including one or more rotating faceted mirrors, or a scanner including rotating refractive elements may be substituted for mirror 18 without departing from the spirit and scope of the present invention. Several such arrangements are well known in the art and a detailed description thereof is not necessary for understanding principles of the present invention.

In theory at least, it may be possible to design a non diffraction-limited imaging lens including sufficient aberration to provide a quasi-flat-topped distribution. The design of such a lens, however, could be expected to be very complex. It may be necessary to design a different lens for each different intensity profile required, whereas in the optical system of the present invention, only the relatively simple and inexpensive aberration-introducing elements need be changed. In particular, to design such a lens with a wide field-of-view that would function with a scanned input beam, and provide the same intensity profile and image spot-size at all required image positions, would be particularly challenging, if at all possible.

Figure 4:
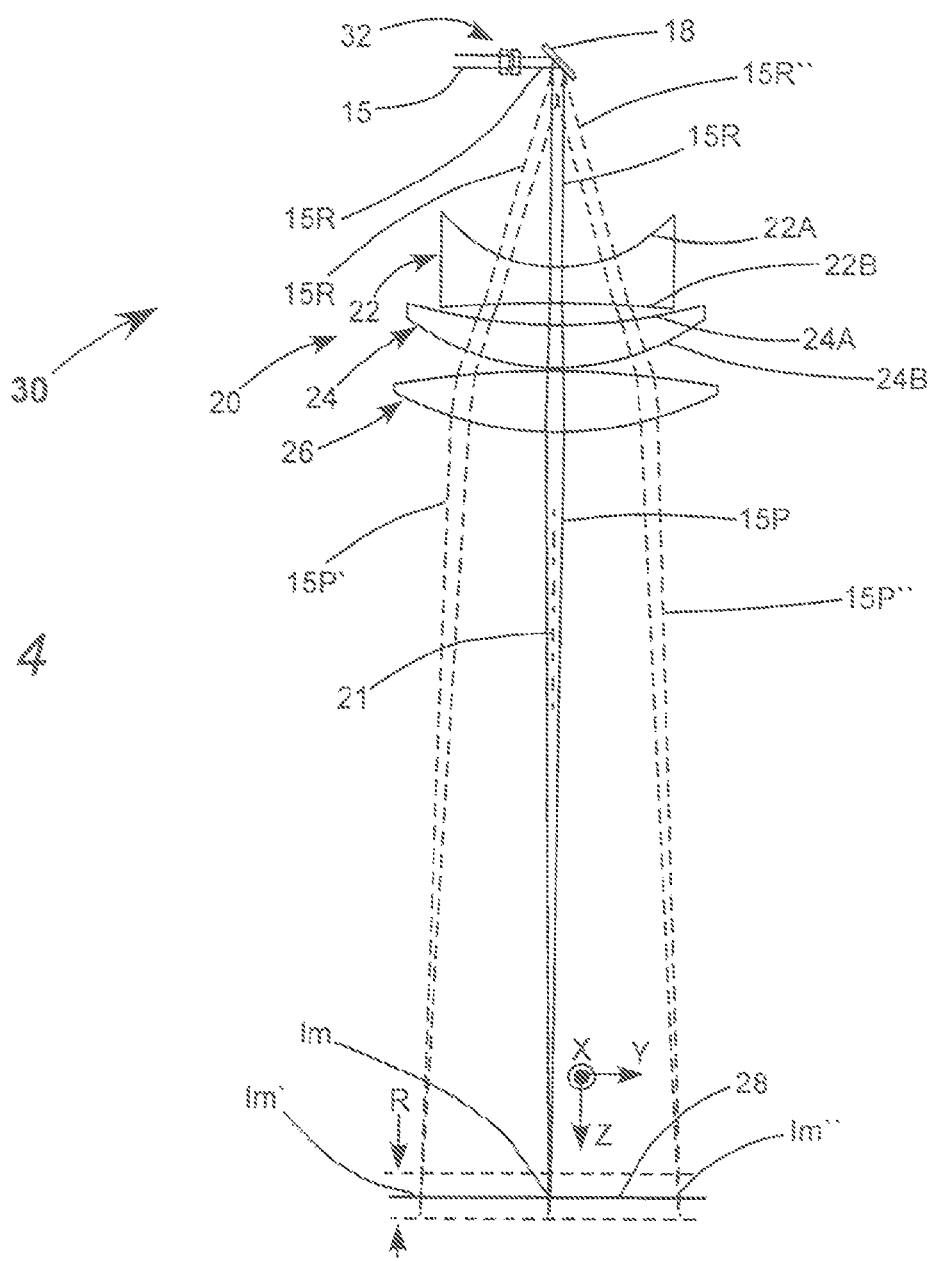
FIG. 4 schematically illustrates another optical system in accordance with the present invention for producing a quasi-flat-topped intensity profile from a Gaussian input beam, similar to the optical system of FIG. 3 but wherein the input laser-beam is high-quality, substantially collimated beam and the singlet collimator is replaced by an air spaced doublet group of optical elements arranged to afocally reduce the diameter of the input laser-beam and introduce third order spherical aberration into the beam.
Figure 4A:
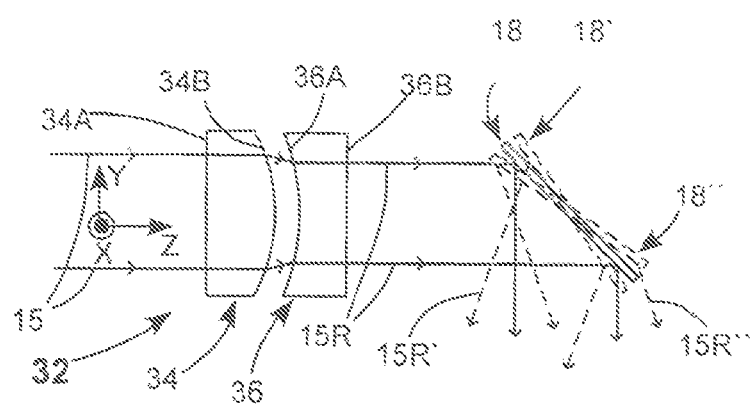
FIG. 4A schematically illustrates further detail of the input beam and the air-spaced doublet of FIG. 4.

FIG. 4 and FIG. 4A schematically illustrate another embodiment 30 of an optical system in accordance with the present invention for projecting an image having a quasi-flat-topped intensity profile from a laser-beam having a Gaussian intensity profile. Optical system 30 is similar to above-described optical system 10 of FIG. 3 with exceptions as follows. In optical system 30, an input beam 15 is a high quality, essentially collimated beam. This can be a single-mode ($TEM_{00}$) beam having $M^2$ about equal to unity, and delivered directly from a laser (not shown); or may be a beam provided by a highly corrected (diffraction-limited) collimator (not shown) from a diverging Gaussian laser-beam. In either case, the collimated beam 15 has a Gaussian intensity profile. In optical system 30, aberration-introducing collimator 16 of system 10 is replaced by an air-spaced doublet 32 in which a first element 34 has positive optical power and a second element 36 has negative optical power. In this example, element 34 is a plano-convex element having input and output faces 34A and 34B, respectively, and element 36 is a concave-plano element having input and output faces 36A and 36B, respectively. Doublet 32 afocally reduces the diameter of input beam 15 while introducing third-order spherical aberration into the beam. The reduced beam is designated by rays 15R (see FIG. 4A). Varying the inclination of mirror 18 to beam 15R from the nominal 45° inclination directs the beam through lens 20, laterally displaced from axis 21. In FIG. 4A this is indicated by depicting mirror 18 in dashed outline in positions 18' and 18". Corresponding inclinations of the reflected collimated beam are indicated by dashed rays 15R' and 15R". Corresponding projected beams 15P' and 15P" are depicted by dashed lines in FIG. 4, and produce corresponding images Im and Im laterally displaced from axis 21.

Figure 5:
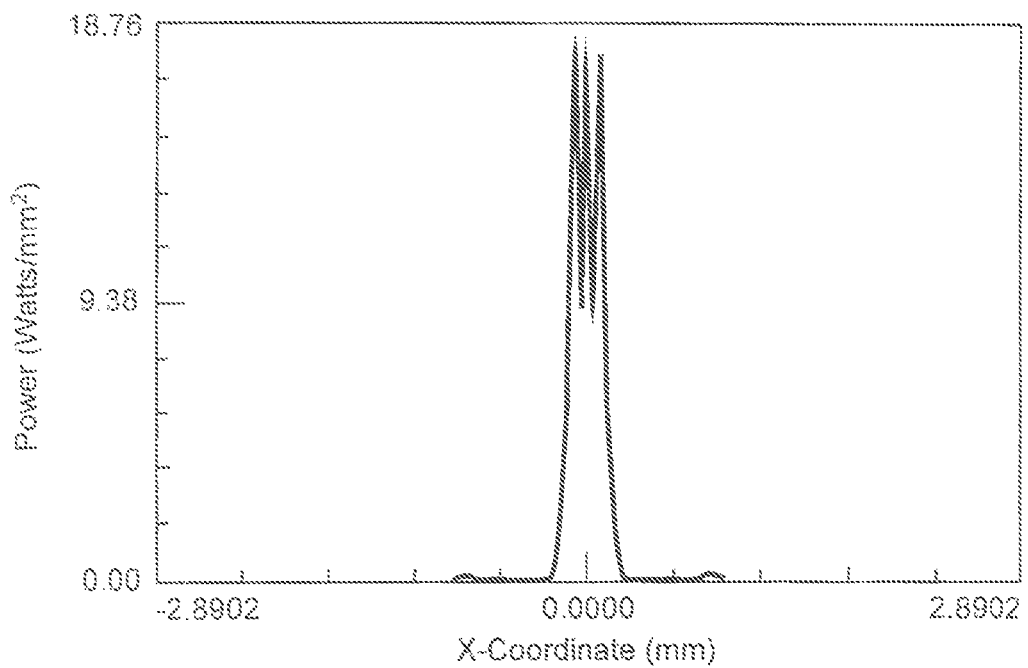
FIG. 5 is a graph schematically illustrating POP beam intensity profile along an axis transverse to the propagation axis for an image projected by one example of the optical system of FIG. 4.

FIG. 5 is a graph schematically illustrating a calculated intensity profile along the X-axis for an image produced by an example of optical system 30. The intensity profile is calculated at a location that is about three Rayleigh ranges axially in front of an aberrated waist location of the projected beam. In this example of optical system 30, lens 20 has the specifications described above with reference to optical system 10 and lens group 32 has specifications as follows. Element 34 is made from silica glass and convex surface 34 thereof has a convex radius of curvature of 3.75 mm. The axial thickness of element 34 is 1.5 mm. Element 36 is made from SF1 glass and concave surface 36A thereof has a concave radius of curvature of 5.2 mm. The axial thickness of element 36 is 1.0 mm. Elements 34 and 36 have an axial (vertex) separation of 0.5 mm. In this example of optical system 30 the waist of a focused projected beam 15P has a diameter of 49.5 µm, and has a Rayleigh range of about 7.25 mm.

Figure 6:
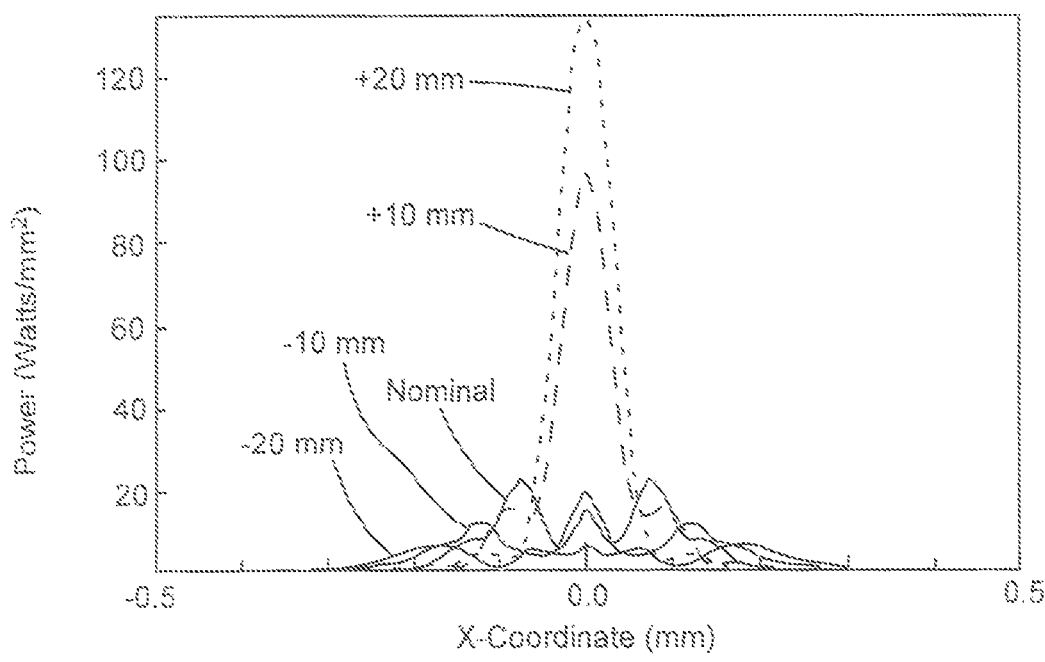
FIG. 6 is a graph schematically illustrating POP beam intensity profile along an axis transverse to the propagation axis at various positions along the propagation axis in a focal region of the optical system example of FIG. 4.

FIG. 6 is a graph schematically illustrating schematically illustrating a calculated intensity profiles along the X-axis for an images at Z-axis positions including the nominal focal plane of the diffraction limited lens and positions −20.0 mm, −10.0 mm, +10.0 mm and +20.0 mm from the nominal position. The intensity profile of FIG. 5 is calculated at a position between the −10.0 mm and nominal locations of FIG. 6. It can be seen that the beam width narrows at locations behind the nominal waist or focus location of the diffraction limited lens producing what may be defined as an aberrated beam waist. Here, that aberrated beam waist would be located between the +10.0 mm and +20.0 mm locations from the nominal (diffraction limited) waist position, and the intensity profile of FIG. 5 would be at about three Rayleigh ranges axially in front of that aberrated waist position.

It is useful to note, here, that in optical systems in accordance with the present invention, the Gaussian intensity profile in a laser-beam is essentially the same on entering and on leaving aberration-introducing elements such as collimating singlet 16 in optical system 10 of FIGS. 3 and 3A, and afocal, beam-diameter-reducing doublet 32 in system 10 of FIGS. 3 and 3A. Such elements serve primarily to introduce aberration into the beam. This aberration imparts a phase difference across the beam such that when the aberrated beam is focused into the focal region of the diffraction-limited lens, interference effects of the phase difference transform the original Gaussian intensity profile into the desired quasi-flat-topped intensity profile within a focal region of the optical system.

Figure 7:
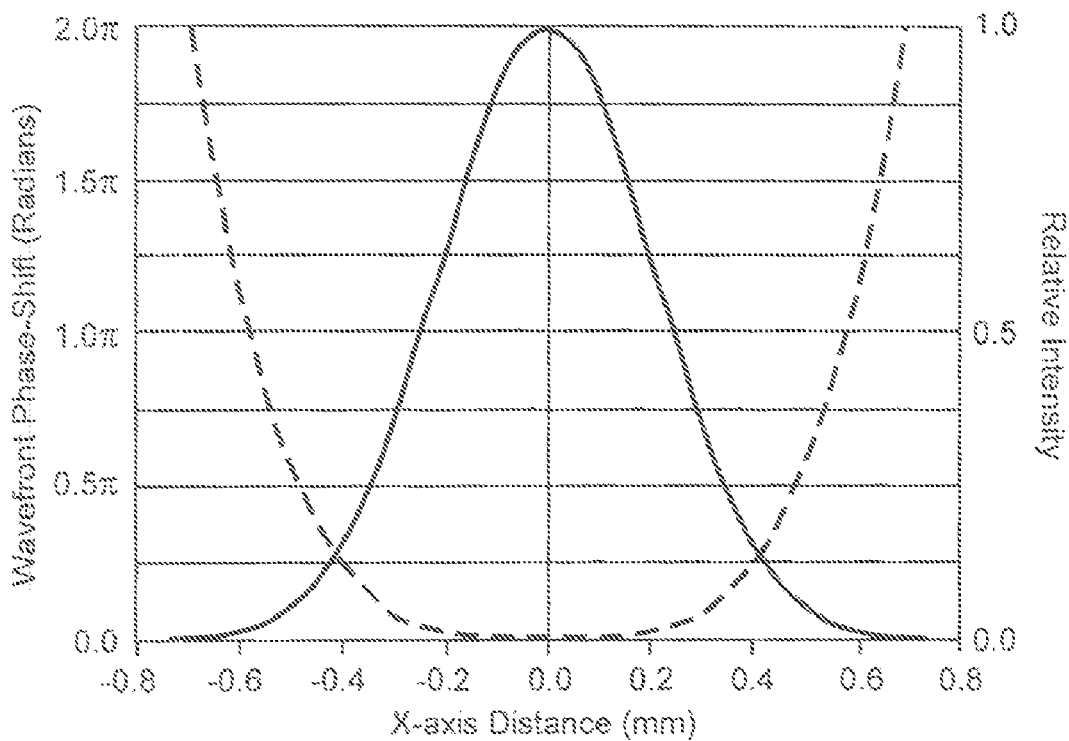
FIG. 7 is a graph schematically illustrating a calculated POP beam intensity profile (solid line) and wavefront phase-shift profile (dotted line) along an axis transverse to the propagation axis of a collimated beam immediately after exiting an example of the aberration-introducing doublet group of FIGS. 4 and 4A.

FIG. 7 is a graph schematically illustrating a calculated intensity profile (solid curve) and wavefront phase-shift (dashed curve) along the X-axis of a collimated beam immediately after exiting a doublet group 32 of FIG. 4A. In this doublet group 32, element 34 is made from fused-silica and convex surface 34 thereof has a radius of curvature of 2.65 mm. The axial thickness of element 34 is 1.5 mm. Element 36 is made from SF11 glass, and concave surface 36A thereof has a radius of curvature of 3.1 mm. The axial thickness of element 36 is 1.0 mm. Elements 34 and 36 have an axial (vertex) separation of 1.5 mm. In aberration-introducing elements in accordance with the present invention, it is preferred that a phase change of at least about 0.125 wavelengths (at the wavelength of the laser beam) occurs between the $1/e^2$ relative intensity (about 0.135 relative intensity) points of the beam.

Figure 8:
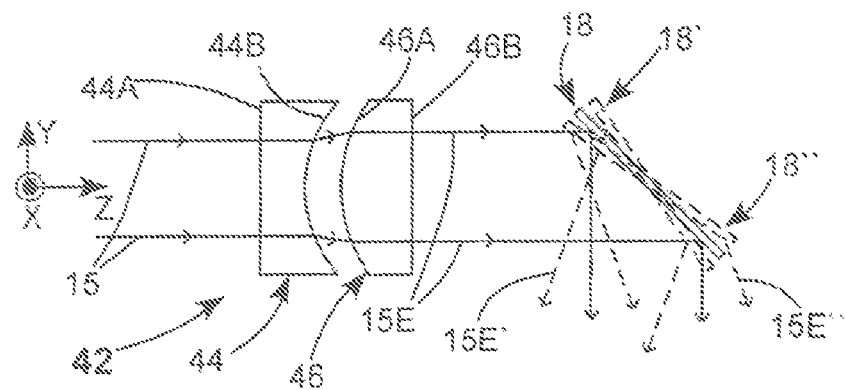
FIG. 8 schematically illustrates another example of an aberration-introducing air-spaced doublet suitable for use in the optical system of FIG. 4

FIG. 8 schematically illustrates an example of a group 42 of aberration-introducing elements 42 that could be substituted for afocal beam-reducing element group 32 in the optical system of FIG. 4. Group 42 is an air spaced doublet comprising a first element 44 having negative optical power and a second element 46 having positive optical power. In this example, element 44 is a plano-concave element having input and output faces 44A and 44B, respectively, and element 46 is a convex-plano element having input and output faces 46A and 46B, respectively. Doublet 42 afocally expands the diameter of input beam 15 while introducing third-order spherical aberration into the beam. The expanded beam is designated by rays 15E. Varying the inclination of mirror 18 to beam 15E from the nominal 45° inclination directs the beam through lens 20 (not shown) laterally displaced from axis 21 thereof. In FIG. 8, this is indicated by depicting mirror 18 in dashed outline in positions 18' and 18". Corresponding inclinations of the reflected collimated beam are indicated by dashed rays 15E' and 15E".

Figure 9:
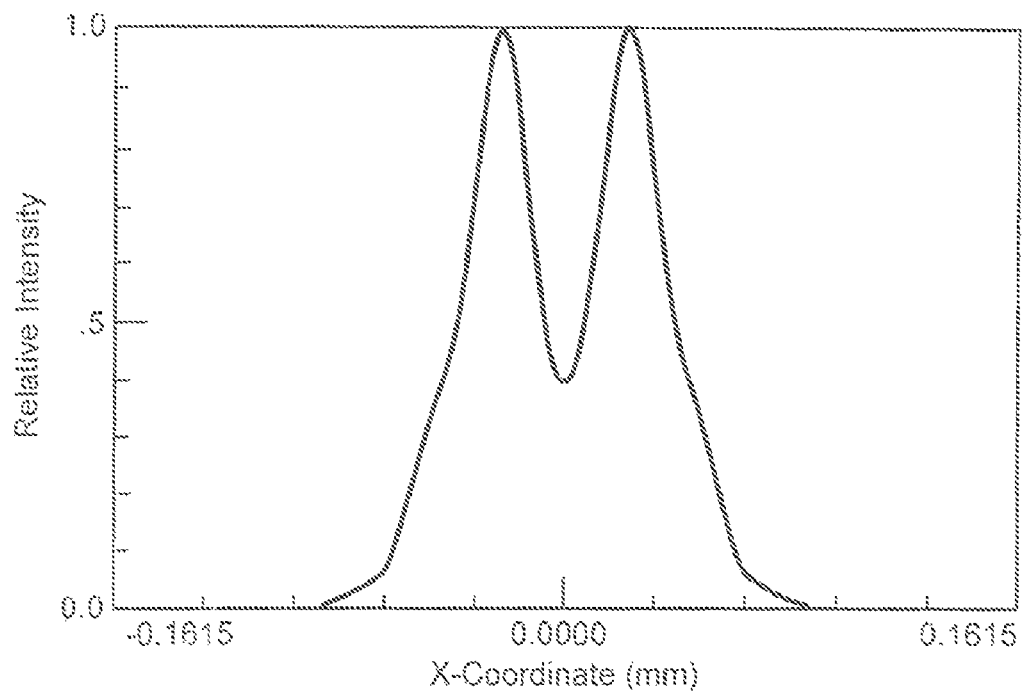
FIG. 9 is a graph schematically illustrating calculated POP beam intensity profile along an axis transverse to the propagation axis for an image projected by an example of the optical system of FIG. 4 including the air spaced doublet of FIG. 8.

FIG. 9 is a graph schematically illustrating a calculated intensity profile along the X-axis for an image produced by another example of optical system 30. This profile is calculated at a position about two Rayleigh ranges in front of the aberrated waist position. In this example of the optical system lens 20 has the specifications described above with reference to optical system 10 and lens group 42 has specifications as follows. Element 44 is made from fused silica and concave surface 34 thereof has a radius of curvature of 2.65 mm. The axial thickness of element 44 is 1.0 mm. Element 46 is also made from fused silica. Convex surface 46A of element 46 has a radius of curvature of 3.11 mm. The axial thickness of element 46 is 1.5 mm. Elements 44 and 46 have an axial (vertex) separation of 0.8 mm. The quasi-flat-topped intensity profile depicted in FIG. 9 may is often whimsically referred to as a "donut" intensity profile because of the relatively deep intensity trough between the intensity peaks. Such an intensity profile is particularly useful in laser welding applications and dermatological applications because it distributes heat more evenly due to thermal diffusion to create a more uniform thermal profile with a less prominent central peak.

Figure 10:
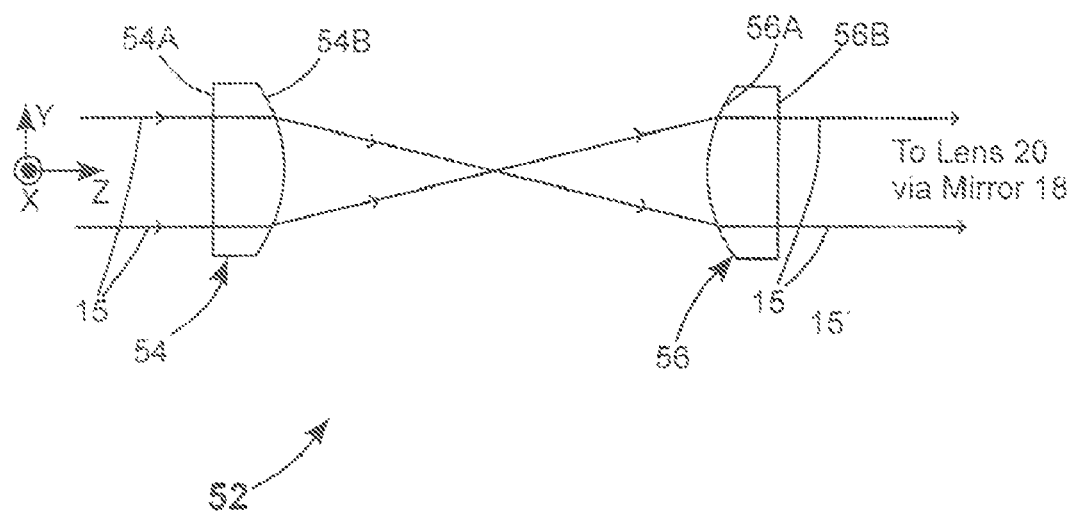
FIG. 10 schematically illustrates an aberration-introducing lens element group, configured as a unit-magnification relay and suitable for use in the optical system of FIG. 4.

FIG. 10 schematically illustrates another example of a group 52 of aberration introducing elements 42 that could be substituted for afocal beam-reducing element group 32 in the optical system of FIG. 4, or (as is the case with other aberration introducing elements in accordance with the present invention) with any other diffraction-limited imaging lens, with or without a scanning arrangement therebetween. Group 52, here, is arranged as a unit-magnification optical relay with lens elements 54 and 56 thereof having equal, positive optical power. In this example, element 54 is a plano-convex element having input and output faces 54A and 54B, respectively. Element 56 is a convex-plano element having input and output faces 56A and 56B, respectively. Convex surfaces 54B and 56A have the same radius of curvature and the elements are confocally arranged. It should be noted, however that elements of different convex radius of curvature, i. e., different positive optical power, may be confocally arranged to provide a relay having a magnification less than or greater than unity. If element 54 has the greater power the beam will be expanded. If element 56 has the greater power the beam will be expanded. It is useful to use the example of FIG. 10 to emphasize, again, how an optical system in accordance with the present invention functions to provide an image having a quasi-flat-topped distribution from an input laser-beam having a Gaussian intensity profile.

Figure 11:
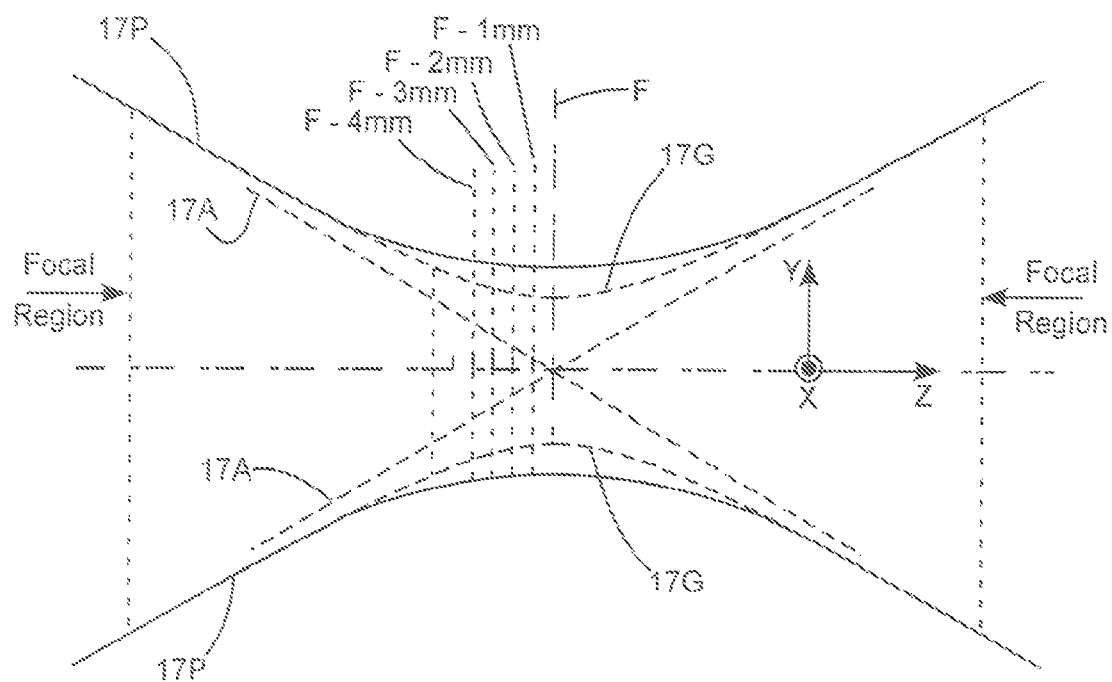
FIG. 11 schematically illustrates a comparison between a focused laser-beam from an optical system in accordance with the present invention as depicted in FIG. 10, and a beam focused by such a system from which the aberration-introducing elements have been removed.

FIG. 11 schematically illustrates a view of the Y-Z plane around the focal region of an optical system in accordance with the present invention. Solid curves 17P represent the $1/e^2$ boundaries or envelope of a beam projected by the inventive system. Dashed curves 17G represent what the beam-envelope would be if the beam were projected by only the diffraction-limited imaging lens of the system, i.e., without first being transmitted through the aberration-introducing elements. This beam-envelope has a characteristic hyperbolic shape of a focused single-mode Gaussian laser-beam. Dashed lines 17A represent the asymptotes of the hyperbola. Envelopes 17P and 17G in this example both have a narrowest portion or waist in a plane F perpendicular to propagation axis Z. This corresponds roughly to the focal plane in a geometrical optics description of the system. Asymptotes 17A, corresponding roughly to focused marginal rays in a geometrical optics description of the system, intersect in plane F. It should be noted that, if there is sufficient aberration introduced in the system, the waist position F of envelope 17G (the nominal or diffraction limited waist position) may not coincide with waist position of envelope 17P, the aberrated waist position, as discussed above with reference to the intensity profiles of FIG. 6.

The effect of the inventive aberration introduction is to cause the projected beam envelope to be distorted from the diffraction-limited Gaussian form in the focal region R about the waist position. Region R is defined above as extending from about four Rayleigh ranges in front of the nominal focal position to about four Rayleigh ranges behind the nominal focal position. The distortion typically broadens the beam and changes the intensity profile in the beam in the nominal focal position. In space between the imaging lens and the focal region, Beam 17P would have a Gaussian distribution.

Figure 12:
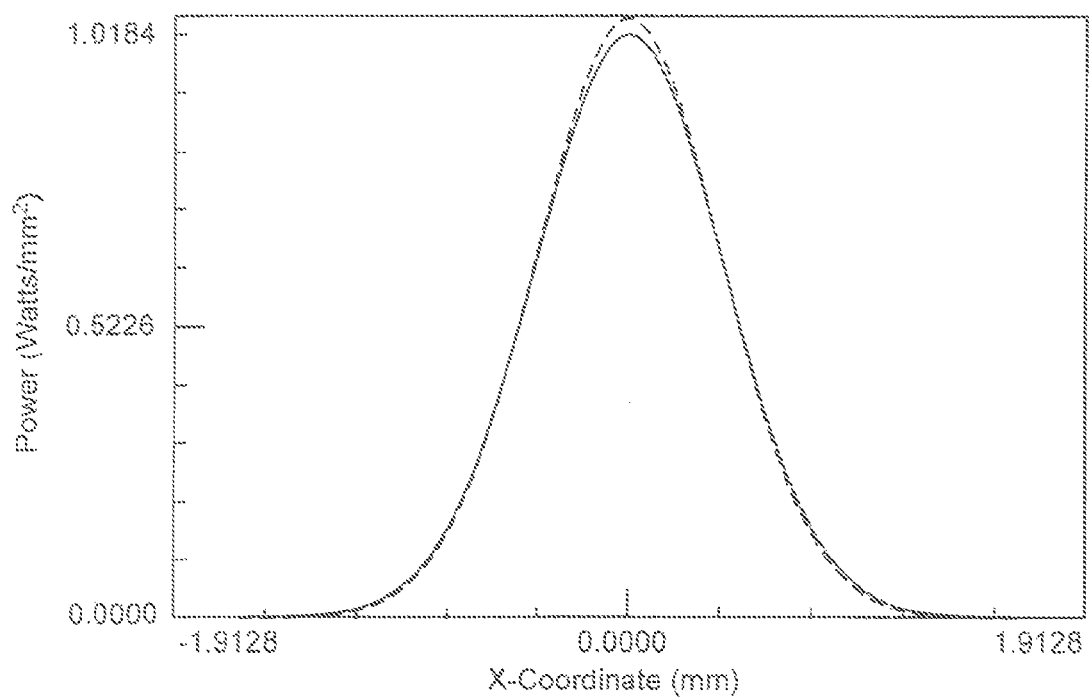
FIG. 12 is a graph schematically illustrating calculated POP beam intensity profile along an axis transverse to the propagation axis for a laser-beam immediately after exiting the diffraction limited lens in one example of an optical system in accordance with the present invention having the aberration elements of FIG. 10, and the calculated POP beam intensity for such a system from which the aberration-introducing elements have been removed.

By way of example, FIG. 12 schematically illustrates a calculated intensity profile along the X-axis (solid curve) for a beam immediately after leaving the imaging lens in another example of an optical system in accordance with the present invention in which lenses 54 and 56 are made from BK7 glass. Surfaces 54B and 56A of the elements each have a radius of curvature of 12.42 mm and the elements each have an axial thickness of 3.5 mm. There is no scanning arrangement in this exemplary system and so the three element wide field lens described above is not used. The imaging lens, here, is a single plano-convex lens element, made from BK7 glass, and having a convex radius of curvature of 51.69 mm and an axial thickness of 3.6 mm. Focal plane F is located at 95 mm from the imaging lens.

In FIG. 12, a dashed curve represents the calculated intensity profile of a beam that would be projected by the imaging lens in the absence of any aberration-introducing elements. It can be seen that both the solid (with aberration) and dashed (without aberration) curves are both Gaussian, and the widths of the curves are essentially the same. The effect of aberration, here, being only about a 3% reduction in peak intensity, compared with that of the un-aberrated beam.

Figure 13:
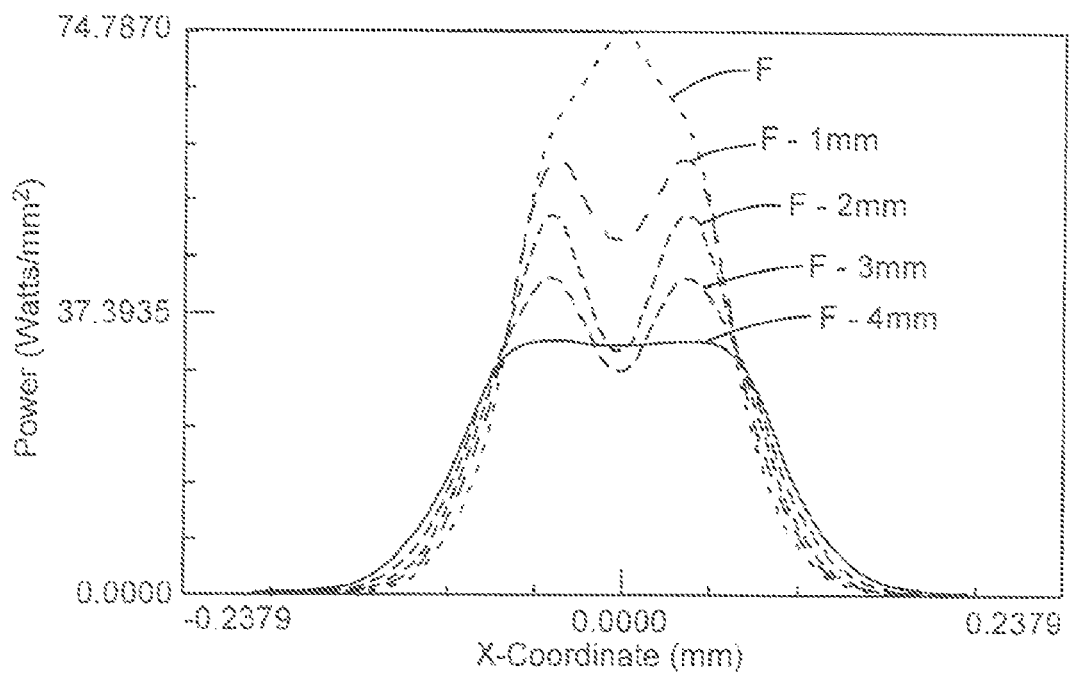
FIG. 13 is a graph schematically illustrating a calculated POP beam intensity profile along an axis transverse to the propagation axis for a laser-beam at various positions in the focal region of the inventive optical system of FIG. 12.
Figure 14:
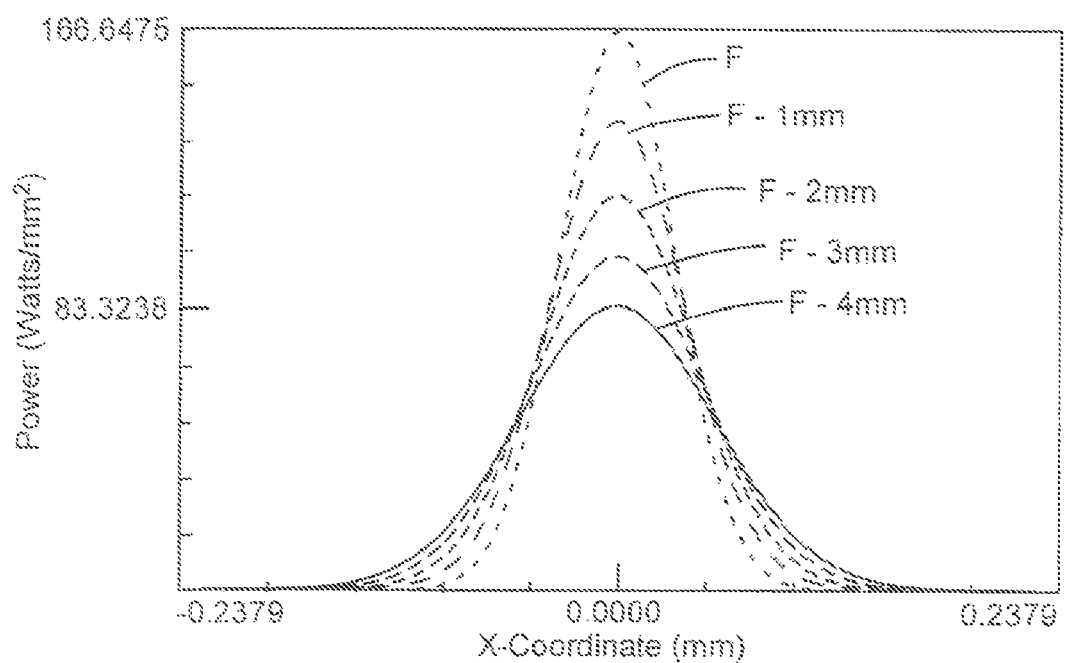
FIG. 14 is a graph schematically illustrating calculated POP beam intensity profile along an axis transverse to the propagation axis for a laser-beam at various positions in the focal region of the optical system of FIG. 12 from which the aberration-introducing elements have been removed.

FIG. 13 schematically illustrates a calculated intensity profile along the X-axis for the exemplary optical system at "focal plane" F and at "defocus" positions, in the focal region, 1.0 mm, 2.0 mm, 3.0 mm, and 4.0 mm from plane F, toward the imaging lens. FIG. 14 schematically illustrates a calculated intensity profile along the X-axis for the imaging lens only, i.e., without any prior aberration-introducing elements, at corresponding positions in the focal region. It can be seen that without the inventive aberration-introducing elements, a projected beam has a Gaussian intensity profile throughout the focal region. The aberration-introducing elements in this example provide that the intensity profile is quasi-flat-topped over at least about 35% of the focal region.

The present invention is described above in terms of a preferred and other embodiments. The invention is not limited, however, to the embodiments described and depicted. Rather, the invention is limited only by the claims appended hereto.

What is claimed is:

1. Optical apparatus, comprising:
   an optical system arranged to receive a laser-beam, said laser-beam having a substantially Gaussian intensity profile, said optical system including a substantially diffraction-limited lens having a longitudinal optical axis and arranged to focus said laser-beam into a focal region having a depth extending parallel to said optical axis, wherein said focal region extends axially plus and minus four Rayleigh ranges of the focused laser beam from a nominal focal plane of said diffraction-limited lens; and
   wherein said optical system further includes one or more optical elements configured to introduce one or more optical aberrations into said laser-beam before said laser-beam is focused into the focal region by the diffraction-limited lens, the extent of said one or more optical aberrations introduced by said one or more aberration-introducing elements being arranged such that the intensity profile of the focused laser-beam is quasi-flat-topped at one or more paraxial positions in said focal region.

2. The apparatus of claim 1, wherein none of said one or more aberration-introducing optical elements is an aspheric optical element.

3. The apparatus of claim 1, wherein said one optical element has a spherical surface.

4. The apparatus of claim 1, wherein said one or more aberration-introducing optical elements introduce third-order spherical aberration.

5. The apparatus of claim 1, wherein said laser beam received by said optical system is a substantially collimated laser-beam.

6. The apparatus of claim 5, wherein there are first and second aberration-introducing optical elements arranged to afocally increase the diameter of the laser-beam, said elements being numbered in the direction of propagation of the laser-beam.

7. The apparatus of claim 6, wherein said first optical element has negative optical power and said second optical element has positive optical power.

8. The apparatus of claim 7, wherein said first optical element has a plane first surface and a concave second surface and the other of said elements has a convex first surface and a plane second surface said surfaces of said elements being numbered in the direction of propagation of the laser-beam.

9. Optical apparatus, comprising:
   an optical system arranged to receive a substantially collimated laser-beam, said laser-beam having a substantially Gaussian intensity profile, said optical system including a substantially diffraction-limited lens having a longitudinal optical axis and arranged to focus said laser-beam into a focal region having a depth extending parallel to said optical axis; and
   wherein said optical system further includes at least two optical elements configured to introduce one or more optical aberrations into said laser-beam before said laser-beam is focused into the focal region by the diffraction-limited lens, the extent of said one or more optical aberrations introduced by said at least two aberration-introducing elements being arranged such that the intensity profile of the focused laser-beam is quasi-flat-topped at one or more paraxial positions in said focal region,
   wherein there are first and second aberration-introducing optical elements arranged to afocally increase the diameter of the laser-beam, said elements being numbered in the direction of propagation of the laser-beam, and
   wherein each of said first and second optical elements has positive optical power, the power of said first optical element being greater than the power of said second optical element, and wherein said first and second optical elements are axially spaced apart such that the laser-beam has an intermediate focus therebetween.

10. The apparatus of claim 9, wherein said first optical element has a plane first surface and a convex second surface and said second optical element has a convex first surface and a plane second surface, said surfaces being numbered in the direction of propagation of the laser-beam.

11. Optical apparatus, comprising:
   an optical system arranged to receive a substantially collimated laser-beam, said laser-beam having a substantially Gaussian intensity profile, said optical system including a substantially diffraction-limited lens having a longitudinal optical axis and arranged to focus said laser-beam into a focal region having a depth extending parallel to said optical axis;
   wherein said optical system further includes at least two optical elements configured to introduce one or more optical aberrations into said laser-beam before said laser-beam is focused into the focal region by the diffraction-limited lens, the extent of said one or more optical aberrations introduced by said at least two aberration-introducing elements being arranged such that the intensity profile of the focused laser-beam is quasi-flat-topped at one or more paraxial positions in said focal region, and
   wherein there are first and second aberration-introducing optical elements arranged to afocally decrease the diameter of the laser-beam, said elements being numbered in the direction of propagation of the laser-beam.

12. The apparatus of claim 11, wherein said first optical element has positive optical power and said second optical element has negative optical power.

13. The apparatus of claim 12 wherein said first optical element has a plane first surface and a convex second surface and the other of said elements has a concave first surface and a plane second surface, said surfaces of said elements being numbered in the direction of propagation of the laser-beam.

14. Optical apparatus, comprising:
   an optical system arranged to receive a substantially collimated laser-beam, said laser-beam having a substantially Gaussian intensity profile, said optical system including a substantially diffraction-limited lens having a longitudinal optical axis and arranged to focus said laser-beam into a focal region having a depth extending parallel to said optical axis;

wherein said optical system further includes at least two optical elements configured to introduce one or more optical aberrations into said laser-beam before said laser-beam is focused into the focal region by the diffraction-limited lens, the extent of said one or more optical aberrations introduced by said at least two aberration-introducing elements being arranged such that the intensity profile of the focused laser-beam is quasi-flat-topped at one or more paraxial positions in said focal region, wherein there are first and second aberration-introducing optical elements arranged to afocally increase the diameter of the laser-beam, said elements being numbered in the direction of propagation of the laser-beam, and wherein each of said first and second optical elements has positive optical power, the power of said first optical element being less than the power of said second optical element, and wherein said first and second optical elements are axially spaced apart such that the laser-beam has an intermediate focus therebetween.

15. The apparatus of claim 14, wherein said first optical element has a plane first surface and a convex second surface and said second optical element has a convex first surface and a plane second surface, said surfaces being numbered in the direction of propagation of the laser-beam.

16. The apparatus of claim 5, wherein there are first and second optical elements numbered in the direction of propagation of the laser beam and said first and second optical elements have equal positive optical power and are axially spaced apart to form a unit-magnification optical relay.

17. The apparatus of claim 16 wherein said first optical element has a plane first surface and a convex second surface and said second optical element has a convex first surface and a plane second surface, said surfaces being numbered in the direction of propagation of the laser-beam.

18. The apparatus of claim 1, wherein said laser-beam is received as a diverging laser beam and there is only one aberration introducing optical element configured and arranged to collimate the laser beam before the laser-beam is focused by said diffraction limited-lens.

19. Optical apparatus, comprising:
an optical system arranged to receive a laser-beam, said laser-beam having a substantially Gaussian intensity profile, said optical system including a substantially diffraction-limited lens having a longitudinal optical axis and arranged to focus said laser-beam into a focal region having a depth extending parallel to said optical axis;
wherein said optical system further includes one or more optical elements configured to introduce one or more optical aberrations into said laser-beam before said laser-beam is focused into the focal region by the diffraction-limited lens, the extent of said one or more optical aberrations introduced by said one or more aberration-introducing elements being arranged such that the intensity profile of the focused laser-beam is quasi-flat-topped at one or more paraxial positions in said focal region; and
a beam displacing device located between said one or more aberration-introducing elements and said diffraction-limited lens for selectively directing said laser-beam into said diffraction-limited lens such that said laser-beam can be provided at selectively different positions transverse to said optical axis of said diffraction-limited lens.

20. The apparatus of claim 19, wherein said beam displacing device is a tiltable mirror arranged to turn the laser beam from the aberration elements through a range of angles about the optical axis of said diffraction-limited lens.

21. Optical apparatus, comprising:
an optical system arranged to receive a laser-beam, said optical system including a substantially diffraction-limited lens having a longitudinal optical axis and arranged to focus said laser-beam to form an image in a focal region having a depth extending parallel to said optical axis of said diffraction-limited lens;
said optical system further including one or more optical elements configured to introduce one or more optical aberrations into said laser-beam before said laser-beam is focused into the focal region by the diffraction-limited lens, the extent of said one or more optical aberrations introduced by said one or more aberration-introducing elements being arranged such that said image has a quasi-flat-topped radial intensity profile; and
a beam displacing device located between said one or more aberration-introducing elements and said diffraction-limited lens for selectively directing said laser-beam into said diffraction-limited lens such that said image can be provided at selectively different positions in said focal region transverse to said optical axis of said diffraction-limited lens.

22. The apparatus of claim 21, wherein said beam displacing device is a tiltable mirror arranged to turn the laser beam from the aberration elements through a range of angles about the optical axis of said diffraction-limited lens.

23. The apparatus of claim 21, wherein said focal region extends axially plus and minus four Rayleigh ranges of the focused laser beam from a nominal focal plane of said diffraction-limited lens.

24. Optical apparatus, comprising:
an optical system arranged to receive a substantially collimated laser-beam, said laser-beam having a substantially Gaussian intensity profile;
said optical system including a substantially diffraction-limited lens having a longitudinal optical axis and arranged to focus said laser-beam into a focal region having a depth extending parallel to said optical axis; and first and second optical elements configured to introduce one or more optical aberrations into said laser-beam before said laser-beam is focused into the focal region by the diffraction-limited lens;
said first and second optical elements being numbered in the direction of propagation of said laser beam and each including first and second surfaces said first and second surfaces being numbered in the direction of propagation of said laser beam; and
wherein said first and second surfaces of said first element are respectively plane and spherical convex, said first and second surfaces of said second element are respectively spherical concave and plane and, and the extent of said one or more optical aberrations introduced by said first and second optical elements is arranged such that the intensity profile of the focused laser-beam is quasi-flat-topped at one or more paraxial positions in said focal region.

25. The apparatus of claim 24, wherein said aberrations include third-order spherical aberration.

26. Optical apparatus, comprising:
an optical source of a diverging laser-beam having a substantially Gaussian intensity profile;
an optical system arranged to receive the diverging laser-beam;
said optical system including a substantially diffraction-limited lens having a longitudinal optical axis and arranged to focus said laser-beam into a focal region having a depth extending parallel to said optical axis; an optical element configured to collimate the diverging laser beam and to introduce one or more optical aberrations into said laser-beam before said laser-beam is focused into the focal region by the diffraction-limited lens; and wherein said laser-beam-collimating and aberration-introducing optical element does not include an aspheric surface and said one or more optical aberrations are arranged such that the intensity profile of the focused laser-beam is quasi-flat-topped at one or more paraxial positions in said focal region.

27. The apparatus of claim 26, wherein said aberrations include third-order spherical aberration.

28. The apparatus of claim 26 wherein said laser-beam-collimating and aberration-introducing optical element has one plane surface and one convex surface.

29. The apparatus of claim 26 wherein said diverging laser beam is delivered from a laser via an optical fiber.

30. The apparatus of claim 26 wherein said diverging laser beam is delivered by a fiber laser.

* * * * *